(12) United States Patent
Goldhamer

(10) Patent No.: US 8,509,177 B2
(45) Date of Patent: Aug. 13, 2013

(54) METHOD FOR TRANSMITTING COMMUNICATIONS IN A WIRELESS NETWORK USING DIFFERENT RE-USE SCHEMES

(75) Inventor: Mariana Goldhamer, Ramat Gan (IL)

(73) Assignee: Alvarion Ltd., Tel-Aviv (IL)

( * ) Notice: Subject to any disclaimer, the term of this patent is extended or adjusted under 35 U.S.C. 154(b) by 220 days.

(21) Appl. No.: 12/812,826

(22) PCT Filed: Jan. 14, 2009

(86) PCT No.: PCT/IL2009/000054
§ 371 (c)(1),
(2), (4) Date: Jul. 14, 2010

(87) PCT Pub. No.: WO2009/090640
PCT Pub. Date: Jul. 23, 2009

(65) Prior Publication Data
US 2010/0316010 A1 Dec. 16, 2010

(30) Foreign Application Priority Data
Jan. 14, 2008 (IL) .......................................... 188754

(51) Int. Cl.
*H04W 4/00* (2009.01)

(52) U.S. Cl.
USPC ........... 370/330; 370/328; 370/329; 370/437; 455/446; 455/447

(58) Field of Classification Search
None
See application file for complete search history.

(56) References Cited

U.S. PATENT DOCUMENTS

| 7,373,150 | B2 | 5/2008 | Cho et al. |
| 7,392,054 | B2 | 6/2008 | Cho et al. |
| 2002/0034158 | A1* | 3/2002 | Wang et al. .................... 370/203 |
| 2004/0097238 | A1 | 5/2004 | Hwang et al. |
| 2005/0197129 | A1* | 9/2005 | Cho et al. ........................ 455/447 |
| 2006/0205422 | A1* | 9/2006 | Hyslop et al. ................. 455/509 |
| 2007/0049283 | A1 | 3/2007 | Kim et al. |
| 2007/0213069 | A1* | 9/2007 | Ji et al. ............................. 455/450 |
| 2008/0232320 | A1* | 9/2008 | Lee et al. ........................ 370/329 |
| 2008/0318585 | A1* | 12/2008 | Kauser et al. .................. 455/446 |

FOREIGN PATENT DOCUMENTS

| EP | 1418776 A | 5/2004 |
| EP | 1575318 A | 9/2005 |
| EP | 1603356 A | 12/2005 |
| EP | 1758419 A | 2/2007 |

* cited by examiner

*Primary Examiner* — Donald Mills
(74) *Attorney, Agent, or Firm* — Browdy and Neimark, PLLC

(57) ABSTRACT

A method is provided for transmitting combined frequency reuse communications in a wireless network. The communications are transmitted along sub-channels associated with given frequency channel partitions. At least one of the combined frequency reuse frames comprises at least one sub-channel operative according to a first reuse scheme and at least one other sub-channel operative according to another reuse scheme. Preferably, the transmission power level for conveying communications along at least one sub-channel assigned in each of the sectors according to the first reuse scheme, is substantially equal to that used in all other sectors, the transmission power level of another sub-channel operative according to another reuse scheme is higher than a first threshold in at least one of the sectors and the transmission power level in at least one other of the sectors is lower than the first threshold but higher than a second threshold.

12 Claims, 16 Drawing Sheets

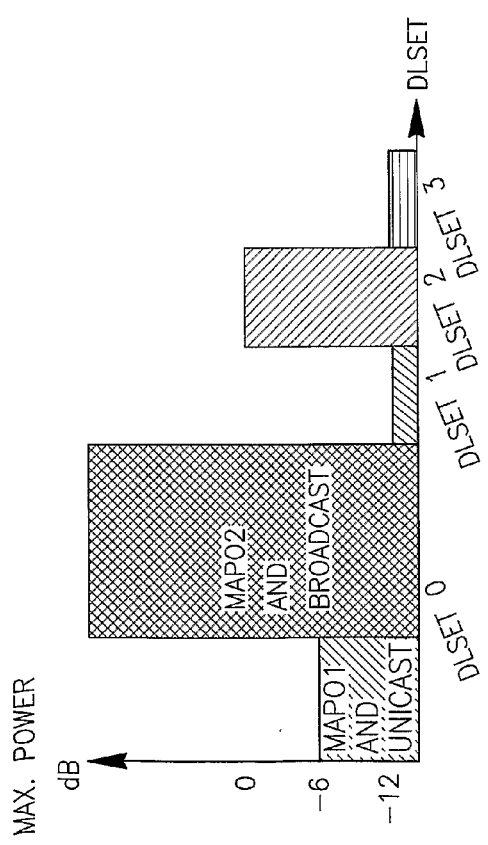
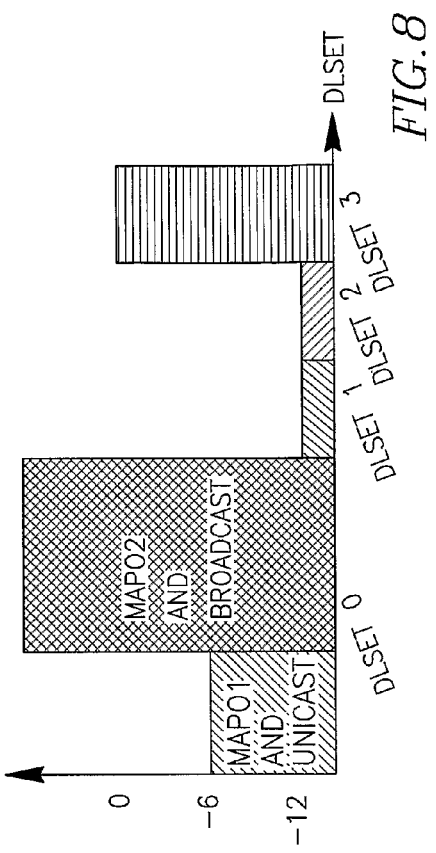
FIG. 7
FIG. 8

TOTAL:60
SUB-CHANNELS(PUSC)

METHOD FOR TRANSMITTING COMMUNICATIONS IN A WIRELESS NETWORK USING DIFFERENT RE-USE SCHEMES

FIELD OF THE INVENTION

The present invention relates to mobile wireless communication systems and in particular, to methods for transmitting data while using combined frequency reuse.

LEGEND

The following are certain abbreviations used hereinafter in the description of the invention:
BS—Base Station
DL—Down Link
EMBS—Enhanced multicast-broadcast service
FDD—Frequency Division Duplex
FFR—fractional frequency reuse
H-FDD—Half-duplex FDD
IMT—International Mobile Telecommunications
IP—Internet Protocol
MBSFN—Multicast broadcast single frequency network
MCH—MAP Control Header
MIMO—multiple-input/multiple-output
MS-Mobile Subscriber station (also used as mobile terminal)
OFDMA—Orthogonal Frequency-Division Multiple Access
PUSC-Partial Usage of Sub-Channels
S/I-Signal to Interference
SS—Subscriber Station
QoS—Quality of Service
SIR—Signal to Interference Ratio
UL—Up Link
ZCH—Zone Control Header

BACKGROUND OF THE INVENTION

A cellular network is characterized by having a plurality of BS each with the capacity to transmit and receive data in a range of frequencies. Unlike a system with a single transmitter where only one transmission can be sent over any given frequency, the cellular network can reuse the same radio frequency in a different area for transmitting completely different information. Unfortunately, frequency reuse has its price and there is an inevitably amount of inter-cell interference from the signal transmitted by other BS which use the very same frequency. The frequency reuse factor is the rate at which the same frequency can be used in the network, and commonly known as simply reuse K (or 1/K according to some) denoting the number of cells which cannot use the same frequencies for transmission. Typical values for a frequency reuse factor are 3, 4, 7, 9 and 12 (or ⅓, ¼, ⅐, ⅑ and 1/12 depending on notation). In the following description the first type of notation is used to denote the reuse factors.

In many cases there are N antennas located at the same base station, each antenna is directed to a different direction and by doing so they divide the cell into N sectors. This division enables implementing a cell frequency reuse as discussed above. For example: reuse 1 (K=1) implies that all the sectors associated with a base station will use the same frequency partition, while reuse 3 (K=3) implies that each sector in a 3 sectors' cell, uses a different frequency or a different partition within a frequency channel. The term "reuse K" as used hereinafter, is used to encompass frequency reuse within a base station which is part of a wireless deployment, calculated for a partition within the frequency channel which uses a power level higher than a given threshold. In a configuration where a base station is associated with three sectors, in a sector operating in accordance with reuse 3 mode, a given frequency channel will be transmitting at high power, while the other two sectors will not utilize that frequency channel at all. Operating in accordance with reuse 1 mode, allows all sectors to utilize the same frequency channel.

Similarly to inter-cell interference caused by the cell frequency reuse, an inter-sector interference is caused by the sector frequency reuse. A better understanding of the areas of interference can be achieved when considering FIG. 1A and FIG. 1B. The two types of interference areas arising in reuse 1 scenario are shown in FIG. 1A for DL. The inter-cell interference occurs at the cell margin where the two adjacent cells overlap.

A relative new method to overcome some of the above-mentioned difficulties in OFDMA systems is the FFR, i.e. only a fraction of the available sub-carriers in a frequency channel are used for data transmission in a sector. This technique, when applied to 802.16 mandatory modes, lowers the average interference per sub-carrier, however does not prevent the collisions between some of sub-carriers when used in adjacent sectors or cells.

The present invention seeks to provide a solution to the above problems by improving at least some of the following parameters: cell edge user throughput, spectral efficiency and cell coverage for both UL and DL, increased spectral efficiency and broadcast traffic support and the like.

SUMMARY OF THE INVENTION

It is an object of the present invention to provide a method to reduce both the inter-cell and inter-sector interference and to increase the utilization of a frequency channel by providing combined reuse modes.

It is another object of the present invention to provide novel methods to transmit a combined frequency reuse communications in a cellular network using, for example OFDMA frames.

It is yet another object of the present invention to provide methods that enable integrating combined frequency reuse and DL/UL power control in order to mitigate interference influence and improve SIR.

It is another object of present invention to provide a method that allows utilizing in every sector the full frequency channel as used in accordance with reuse 1 scheme, and to enable in at least one of the sectors to enjoy interference mitigation properties of reuse 3.

It is still another object of the present invention to provide different framing possibilities in the frequency domain, more suitable to OFDMA systems.

Other objects of the invention will become apparent as the description of the invention proceeds.

The method provided by the present invention allows limiting or even avoiding contentions of sub-carriers, by combining different reuse modes with orthogonal frequency partitions.

The received signal quality by an MS may be improved by scheduling the MS, in the frequency partitions with higher frequency reuse factor, due to lower interference levels. This will be helpful for MSs located around cell boundary or for MSs that suffer severe inter-cell interference. On the other hand, BS may use the entire frequency channel in accordance with reuse 1 mode as long as the transmissions in this reuse mode would not create interference to the communications using higher reuse modes. This will enable the BS to serve more MSs with increased data rates and achieve better spectral efficiency.

In accordance with a first embodiment of the present invention there is provided a method for transmitting a combined frequency reuse communication in a wireless network wherein said wireless network comprising at least two base stations each of which is operative to transmit communications to at least three sectors and wherein communications transmitted by each of said at least two base stations are transmitted along a plurality of sub-channels associated with given frequency channel partitions, the method is characterized in that at least one of the transmitted combined frequency reuse communication frames comprises at least one sub-channel operative in accordance with a first reuse scheme and at least one other sub-channel operative in accordance with a reuse scheme which is different from the first reuse scheme.

As will be appreciated by those skilled in the art, referring to the first reuse scheme as "first" throughout the specification and claims, must not be interpreted as being limited to "reuse 1" scheme, but should be understood to be of any applicable reuse scheme as will be find appropriate when implementing the present invention.

According to a preferred embodiment of the present invention, the transmission power for conveying communications along at least one sub-channel assigned in each of the at least three sectors according to the first reuse scheme, is substantially equal to that used for conveying communications according to said first reuse scheme in each of the other sectors, and wherein the at least one other sub-channel operative in accordance with the other reuse scheme, is adapted to convey communications at a transmission power higher than a first pre-defined threshold in at least one of the at least 3 sectors and to convey communications in at least one other of the 3 sectors at a transmission power level being lower the first pre-defined threshold but higher than a second pre-defined threshold. In accordance with another preferred embodiment of the invention, the plurality of sub-channels is divided into a plurality of groups, and wherein at least one of the plurality of groups is characterized in that all sub-channels comprised therein are transmitted using substantially the same transmitting power.

As will be appreciated by those skilled in the art, the term "group" as used herein is equivalent to the term "partition" as used herein and in the art. The sub-channels groups constitute one or more deployment sets. A set is characterized by one or more of the following parameters: type of frequency reuse scheme, sector of action and transmitting power.

By another preferred embodiment of the invention, the plurality of sub-channels is divided into a plurality of groups, and wherein at least one of the plurality of groups is capable of modifying at least one transmission parameter of at least one of the sub-channels comprised therein.

According to still another preferred embodiment of the invention, at least one group of sub-channels is allocated for transmitting communications in at least two sectors.

In accordance with yet another preferred embodiment of the invention, at least one group of sub-channels is used for transmitting communications in at least one sector at a power level higher than a pre-defined threshold. More preferably, the same group of sub-channels is used by at least one other sector, provided that the level of interference to the at least one sector does not exceed a predetermined level. Still more preferably, the interference to that at least one sector is mitigated by using lower power or interference cancellation techniques.

According to another preferred embodiment of the invention, the communications transmitted by the at least one of the two base stations are transmitted according to a pattern whereby at least two alternate OFDMA frames constituting a super-frame, and wherein at least one sub-channel comprised in one of the frames constituting the super frame is operative in accordance with a different reuse scheme than any of the sub-channels comprised in an alternate frame.

By still another preferred embodiment of the invention, further comprising providing an MS operative to communicate with at least one of the at least two base stations in accordance with at least one of the reuse schemes, with a pre-defined allocation of sub-channels and in response to the MS sending a signal to the at least one BS, a sub-channel is selected from among the allocated sub-channels for that MS to communicate with the at least one base station.

According to yet another preferred embodiment of the invention, at least one of the groups of sub-channels used in accordance with a reuse 1 scheme, is split into unicast sub-channels (for exchanging regular data) and into broadcast and/or multicast sub-channels. Preferably, communications conveyed along sub-channels used for conveying broadcast data are transmitted while using a higher sub-channel power than the power used for communications transmitted along sub-channels used for conveying unicast data.

According to another aspect of the invention there is provided a method for transmitting a combined frequency reuse communication in a wireless network wherein said wireless network comprising at least two base stations each of which is operative to transmit communications to at least three sectors and wherein at least two different frequency channel partitions are each associated with a different group of sub-channels, and wherein transmission of control information associated with each group of sub-channels is characterized by having a different modulation scheme and/or channel coding and/or MIMO matrix coding mode.

BRIEF DESCRIPTION OF THE DRAWINGS

FIG. 7 shows a schematic example of power distribution as used by a specific sector in the base station (sector 2);

FIG. 8 shows a schematic example of power distribution as used by another specific sector in the base station (sector 3);

DETAILED DESCRIPTION OF THE INVENTION

A better understanding of the present invention is obtained when the following non-limiting detailed description is considered in conjunction with the following drawings. As will be noted, the term "frame" or "sub-frame", used in connection with the drawings, is used to denote a time interval in which the allocation of sub-channels for different reuse modes remains un-changed.

As will be appreciated by those skilled in the art, one of the objects of the method provided by the present invention is to allow the operator to obtain an increased spectral efficiency by reusing the frequency channel in each sector and at the same time to reduce the interference. Example frames implementing some of the principles of the present invention are described below.

Figure 1A:
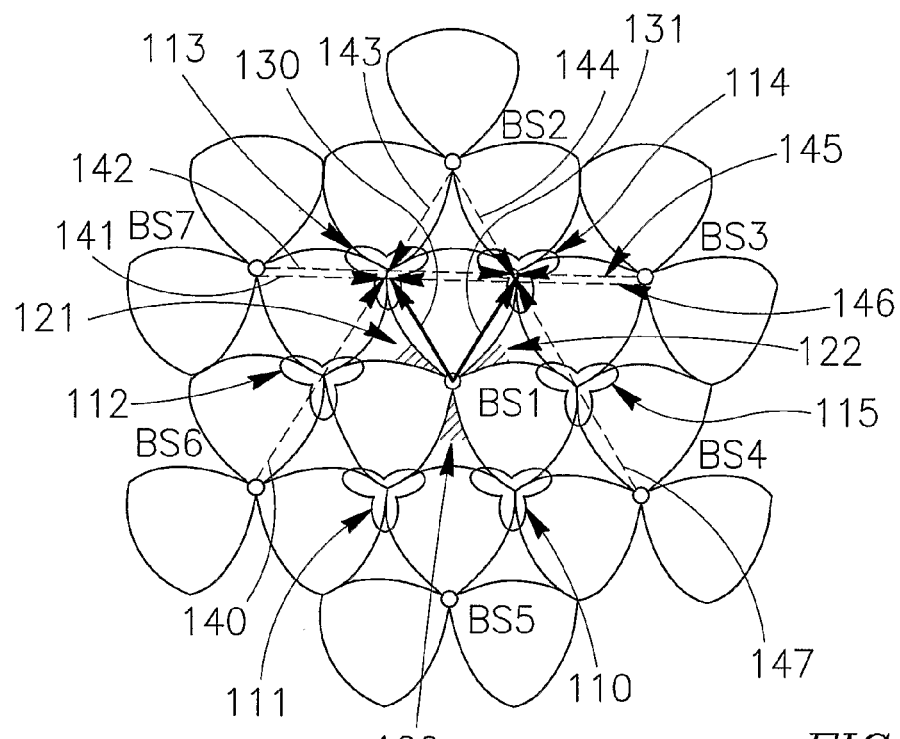
FIG. 1A illustrates inter-cell and inter-sector interference in DL transmissions carried out according to prior art methods.

The frame structures provided by the present invention provide one or more of the following advantages:

Capable of overlapping power-conditioned reuse 1 and reuse 3 approaches within the same frame, to improve the frequency channel reuse, increase the SIR ("Signal to Interference Ratio") at cell margin and to enable the inter cell/sector interference management;

Enable multiple MCH ("MAP Control Header") and/or MAP message (i.e. medium access control message) transmission modes to increase SIR and spectral efficiency per transmission;

Enable providing dedicated Reuse-1 zone to form a single frequency network for broadcast traffic;

Allow coordinated UL ("uplink") sub-channel selection zone for pro-active opportunistic scheduling; and Allow coordinated UL sounding Interference Problem in Reuse 1 Scenario There are two problems in the Reuse 1 scenario: inter-cell interference and inter-sector interference. As previously explained, FIG. 1A presents an interference problem for DL (downlink) at the cell margin, where two adjacent cells and sometimes cells that are located apart, might create interference to each other's transmissions of the desired signal, causing in the worst case, an average negative SIR (Signal to Interference Ratio) of −(5 . . . 6) dB per some subcarriers (e.g. 3 dB from adjacent sectors, and another approximately 2 dB from the more remote interfering sectors). If we consider the channel fluctuations and the Doppler effects the interference levels on specific sub-carriers might be even worse.

FIG. 1A shows the deployment problem with Reuse 1, for areas in which the inter-cell or inter-sector interference are dominant.

In this figure the inter-cell interference areas are 110-115 and the inter-sector interference areas are 120-122. The desired signal's direction is marked by continuous lines (130-131), while the interfering links are marked by dashed lines (140-147). FIG. 1.B shows the same interference areas but this time for UL. 150-155 are the inter-cell interference areas, and the inter-sector interference areas are 160-162. The desired signal's direction is marked with continuous lines (170), while the interfering links are marked with dashed lines (180-185).

The DL permutations in PUSC ("Partial Usage of Sub-Channels" mode) allow mitigating the gravity of the problem for relatively narrow data transmissions, occupying one channel. However there are cases in which there is a penalty of lower spectral efficiency due to the lack of an appropriate solution that is able to reduce the SIR for one or more of the following:

transmission of MAP (which comprises scheduling information for different down-link and up-link communications);

high demanding traffic, such as IP-Video or Internet browsing, for which the probability of collisions between sub-carriers of adjacent cells may become too high;

broadcast traffic transmissions, for which the collisions between sub-carriers of adjacent cells create a serious disadvantage, as for such type of transmissions, a relatively high QoS is expected.

Due to the above problems, the reuse 1 significantly reduces the peak data rate and is therefore avoided in practical deployment solutions. Instead, in many deployments the reuse 3 solution is preferred. In other words, a reuse 3 solution is practically found to be more adequate for addressing coexistence problems at cell margins.

Figure 1B:
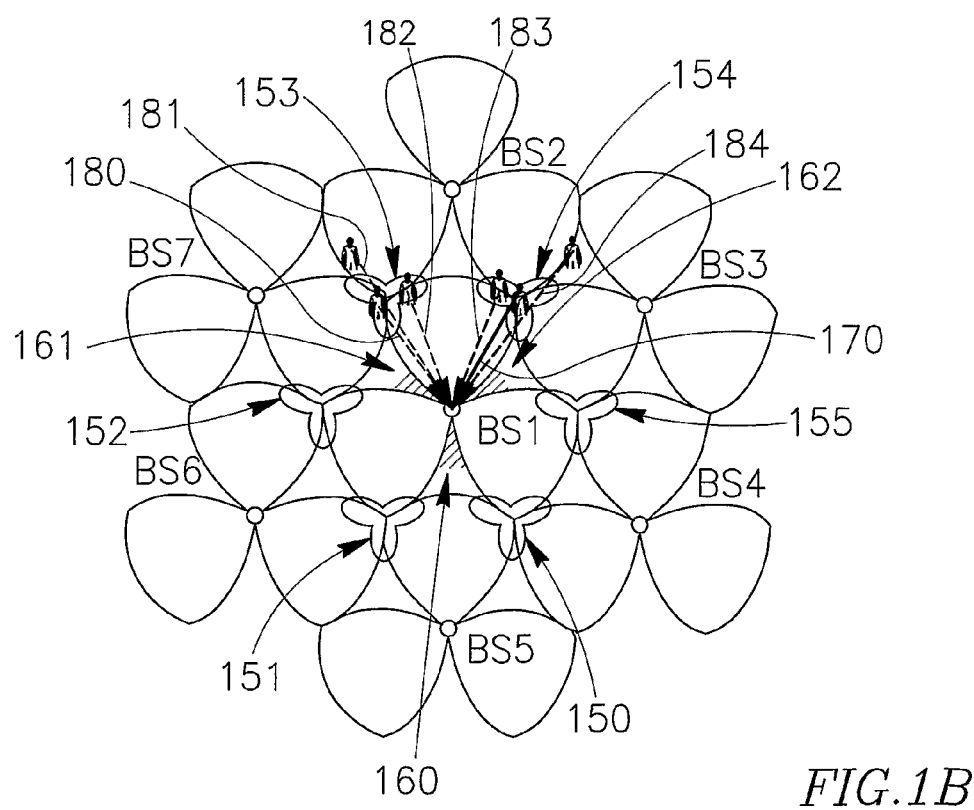
FIG. 1B shows inter-cell and inter-sector interference in UL transmissions carried out according to prior art methods.

A similar problem occurs in the UL (up-link) as shown in FIG. 1B.

Coverage and MAP Efficiency

Due to the fact that a MAP starts always at the same time and sub-channel location, uses all the sub-carriers in a segment and the same permutations are applied to all the sectors during its transmission, simulations show that even if one were to adopt the reuse 3 solution, still, in areas with high shadowing probability, there will be a relatively large percentage of low SIR situations.

In order to address these problems, under the constraint of 95% cell coverage, at least some of the following system parameters should be improved: cell edge user throughput, spectral efficiency and cell coverage for both UL and DL transmissions, spectral efficiency and broadcast traffic support, an adequate FRAME, and the like.

To the above, one could add delay constraints and overhead problems generated by too short packets. In order to address these requirements, certain embodiments of the method provided by present invention enable different framing possibilities in the frequency domain, more suitable to OFDMA, in a combined time-frequency approach as well as in time domain only. The support of more stringent delay requirements will impact on the implementation complexity.

Frame Type 1—OFDMA Sub-Channel Domain

In accordance with an embodiment of the present invention the IEEE 802.16m and LTE frame provided, enables to combine reuse 1 and reuse 3 operations, into a single frequency channel. The term "reuse 1" implies that all the sectors associated with a base station use the same frequency partition, while the term "reuse 3" implies that each frequency partition is used by a single sector from among a group of three sectors, at a power level higher than a threshold. Such partitions, each of which includes a number of sub-channels, are called DLSET and ULSET for respective DL and UL transmissions. In OFDMA the active carriers are grouped in subsets of subcarriers, and such a sub-set is also referred to herein as sub-channel.

Downlink Sub-Frame
Partition in SETs

Figure 2:
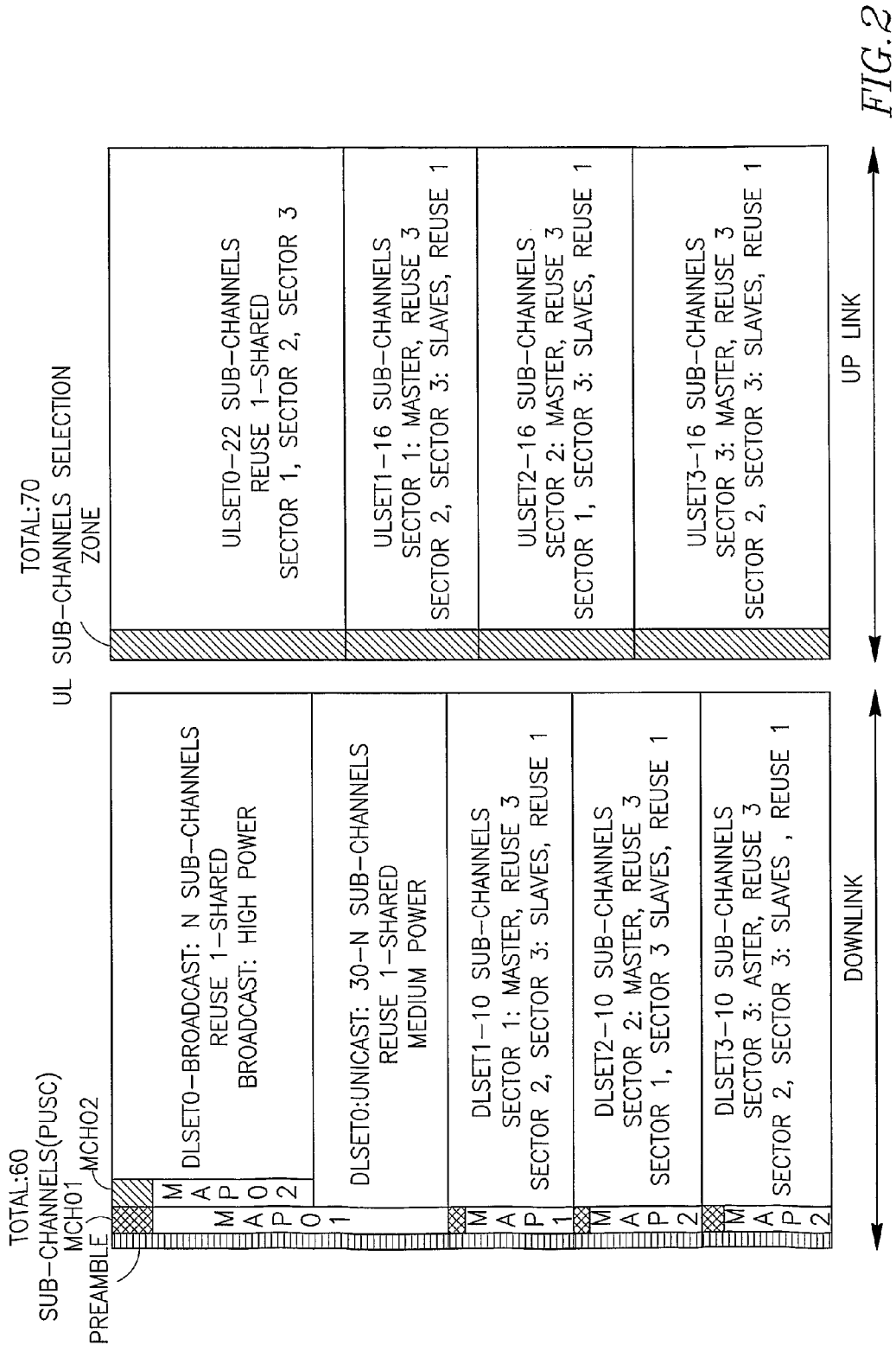
FIG. 2 illustrates a schematic frame structure suitable for 3 sectors deployments, with a first type of allocation by which control information is transmitted in DLSET 0.

Let us consider an example of a frame as described in FIG. 2, which is partitioned between reuse 1 and reuse 3 sets. For example, in the case of 3 sectors deployment, the reuse 1 sets will be used in all the sectors, while every one of the reuse 3 sets would be allocated to a specific sector, and be used while applying high transmission power. Every set is assigned with a number of sub-channels, preferably in a way that avoids collisions between subcarriers allocated to different sets. The frequency band in this example comprises a total of 60 sub-channels for DL transmissions and 70 sub-channels for UL transmissions.

The left part of this FIG. describes the allocation for DL transmissions while the right side describes the allocation for UL transmissions. In the DL part, one may note a division to 4 sets:

DLSET 0—this set is intended for reuse 1. It comprises 30 sub-channels and is further split into multiple sub-sets, which preferably use different maximum sub-carrier power levels. N sub-channels are used to broadcast in a high power, and N-30 sub-channels are used to unicast in a medium power (unicast transmission is used to denote sending of information packets to a single destination, as opposed to broadcast transmission which refers to transmitting to all destinations). The different modes have different MAPs but the same preambles.

DLSET 1—comprises 10 sub-channels, wherein sector 1 functions as the master, transmitting in reuse 3 configuration, while sectors 2 and 3 function as slaves and transmitting in reuse 1. By referring to sector 1 as master and to sectors 2 and 3 as slaves it means that sectors 2 and 3 may transmit as long as they do not create interference to the communications exchanged in sector 1. By referring in FIG. 2 to sector 1 as operating in reuse 3, it is meant that high transmission power can be applied only by this sector. By referring to sector 2 and 3 as operating in reuse 1 it means that they reuse the same frequency resource as that allocated to sector 1. In other words, the same frequency resource (sub-carriers) can be used by different sectors at the same time, as long as they do not create interference to communications of the master sector for that specific frequency resource. There are multiple methods for achieving interference mitigation or cancellation, like MIMO/advanced antenna techniques using different pre-coding matrixes and/or power rules, to be described in continuation. Based on the slave rule, there are cases when not all the potential Slave sectors will be allowed to operate in parallel, creating situations when only one master and one slave sector will use the same frequency partition.

DLSET 2—comprising 10 sub-channels, wherein sector 2 functions as the master transmitting in reuse 3 configuration, while sectors 1 and 3 function as slaves, transmitting in reuse 1.

DLSET 3—comprising 10 sub-channels, wherein sector 3 functions as the master transmitting in reuse 3 configuration, while sectors 1 and 2 function as slaves transmitting in reuse 1.

In the UL, where there are a total of 70 sub-channels there is also a division for 4 sets ULSET 0—this set is intended for reuse 1 and comprises 22 sub-channels.

ULSET 1—comprising 16 sub-channels, wherein sector 1 functions as the master and is operative to receive transmissions in a reuse 3 configuration, while sectors 2 and 3 function as slaves and are adapted to receive transmissions in a reuse 1 configuration.

ULSET 2—comprising 16 sub-channels, wherein sector 2 functions as the master and is operative to receive transmissions in a reuse 3 configuration, while sectors 1 and 3 function as slaves and are adapted to receive transmissions in a reuse 1 configuration.

ULSET 3—comprising 16 sub-channels, wherein sector 3 functions as the master and is operative to receive transmissions in a reuse 3 configuration, while sectors 1 and 2 function as slaves and are adapted to receive transmissions in a reuse 1 configuration.

Every DLSET may be transmitted with its own preamble, MCH ("MAP Control Header") and MAP. The MCH contains the MAP Control Prefix data structure which clarifies how the MAP messages shall be decoded. The MCH and the MAP (including both DL MAP and UL MAP) are sometimes referred to herein as a "Control Channel".

According to an embodiment of this example, the DLSET0, intended for reuse 1, is further split into multiple sub-sets, which preferably use different maximum sub-carrier power levels, like the data sub-set—DLSET01 and the broadcast sub-set—DLSET02.

Figure 3:
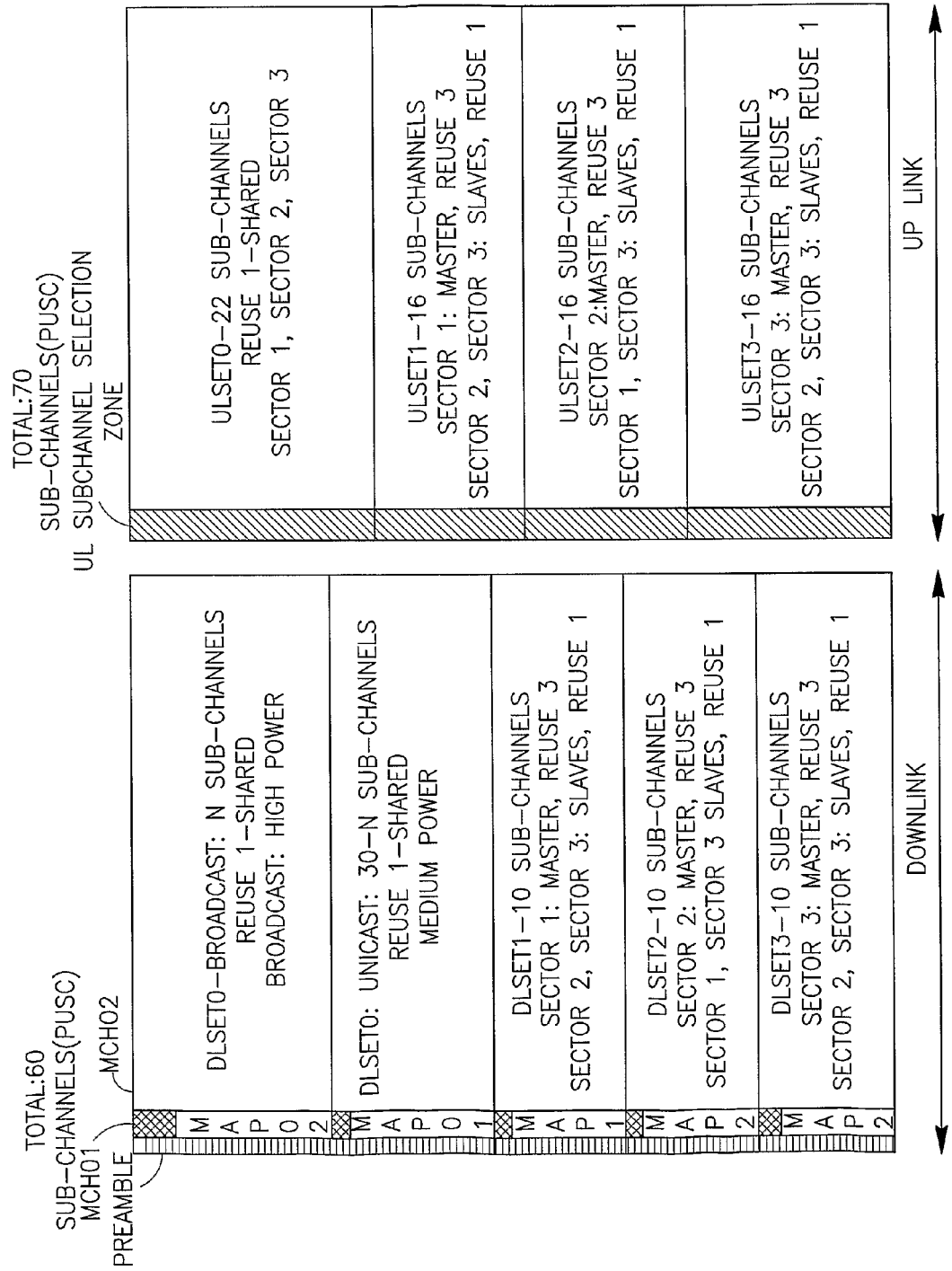
FIG. 3 illustrates a schematic frame structure suitable for 3 sectors deployments, with a second type of allocation by which control information is transmitted in DLSET 0.

The broadcast zone, intended for the E-MBS, includes its own MCH02 and MAP and can use much higher sub-channel powers than used for all other SETs or sub-sets. Due to the adjacent sub-carrier interference, the carriers allocated for the Broadcast sub-set should be separated by one or more guard carriers from the carriers allocated to the other zones. A number of sub-channels are dedicated to the Broadcast zone. The duration of the Broadcast Zone is preferably programmable and more preferably, is included in its private MAP. Further features that can be obtained by implementing the approach described in this example are:

Separation between broadcast and unicast transmissions as of the beginning of the preamble. MCH and MAPs for broadcast and unicast allocation of DLSET01 and DLSET02, respectively (FIG. 3). This approach offers, best performance, with the disadvantage of more parallel processing requirements. However, in the following description reference is made to the variant illustrated in FIG. 2.

Transmission of the broadcast preambles, MCH and MAP is first carried out over the full DLSET0, and proceeded with unicast MCH and MAP transmissions over DLSET01.

The SETS intended for reuse 3 are referred to as SET1, SET2 and SET3. These sets may include their own preambles, MCH and MAPs and may be transmitted using the maximum sub-carrier power assigned for the unicast services.

According to the method provided by the present invention, the full frequency channel may be used in every sector, similarly to the way it may be used in accordance with the reuse 1 scheme. However, in addition, sector 2 enjoys the interference mitigation properties of reuse 3. Such a configuration may be considered as using "overlapped reuse modes".

Figure 4:
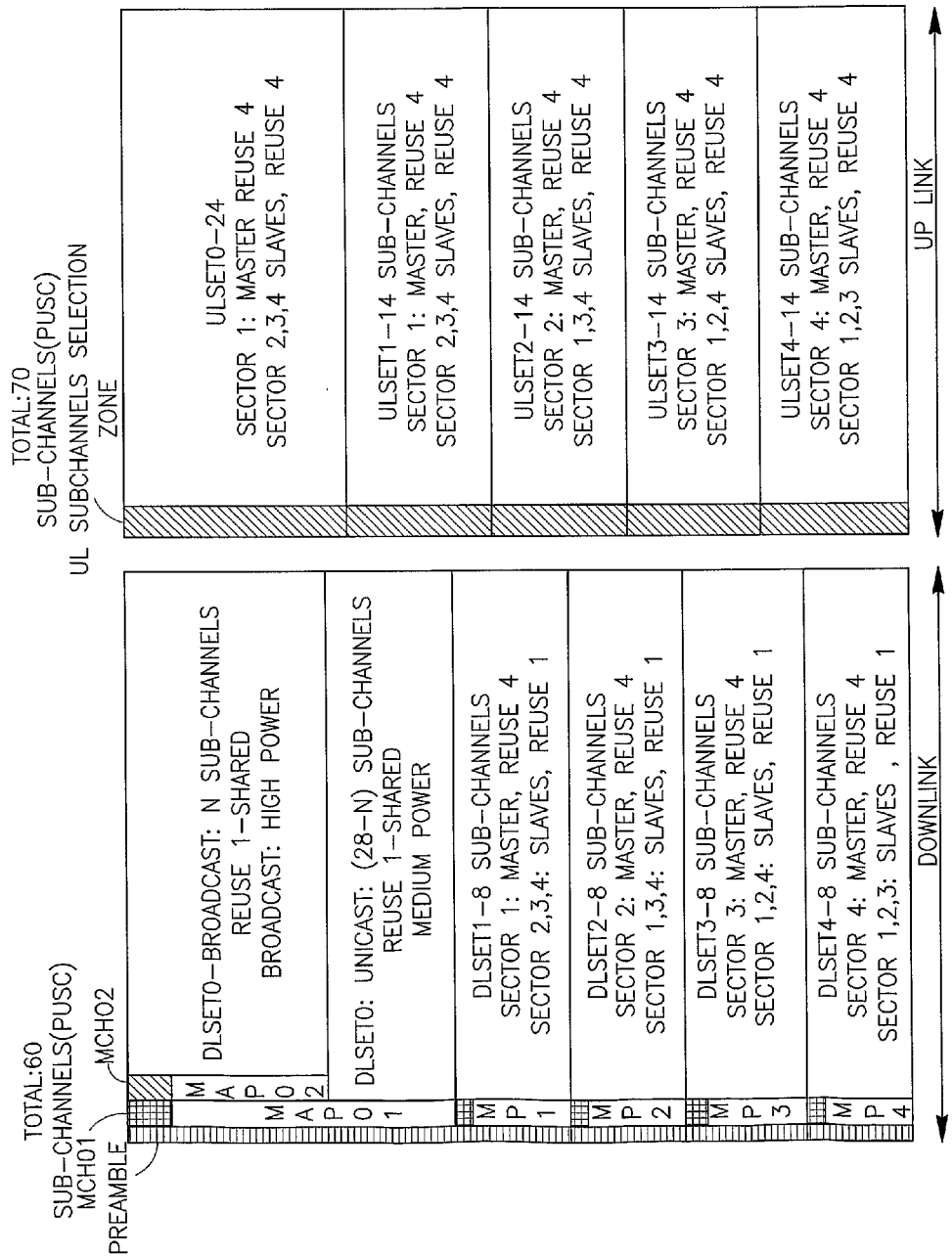
FIG. 4 illustrates a schematic frame structure suitable for 4 sector deployments.

FIG. 4 presents a frame structure for a combined frequency reuse for deployments using 4 sectors, combining reuse 1 and reuse 4 allocations. An additional Master set was introduced for matching the reuse 4 deployment.

For the convenience of the reader most of the examples provided herein refer to a 3 sectors cell configuration, it should be noted that the present invention should not be considered as being limited to such a configuration. It should be clear to any person skilled in the art that the same embodiment can be easily implemented to any multi sector cell configuration, mutatis mutandis, without departing from the scope of the present invention.

Flexible SET Allocation

Figure 5:
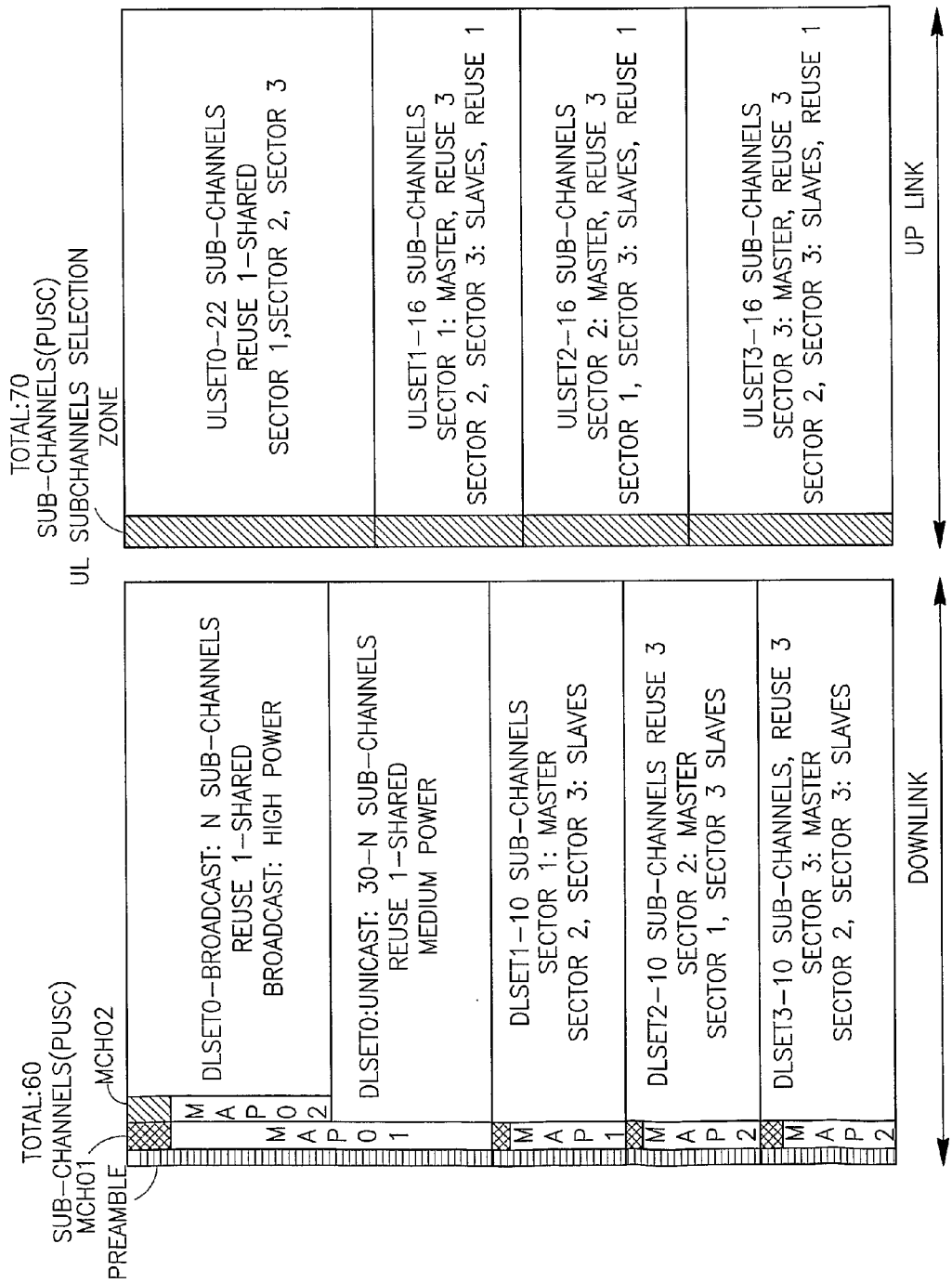
FIG. 5 shows a schematic frame structure suitable for flexible SET allocations.

The division between all sets may differ based on a number of factors, like the amount of broadcast traffic, rural/sub-urban/urban deployment, etc. In order to address these variations, while still operating in a robust mode, a frame modified in accordance with the present invention would preferably start at a pre-determined mode, with the possibility that the MCH and/or the MAP determine the actual sub-channel/sub-carrier allocation to the different sets. FIG. 5 illustrates an embodiment by which data is transmitted while using different allocation relative to the initial MCH/MAP transmission.

By another embodiment, the MCH at the start of the frame has pre-defined allocated sub-carriers and is transmitted with pre-defined parameters, as modulation, coding, cell_id, permutation, etc. The Map prefix transmitted during the MCH may include parameters to correctly decode the associated MAP (coding, duration) and a pointer indicating the start of the zone in which the MAP is transmitted. The MCH may also indicate the structure of the zone and point to one or more other MCHs.

Power Allocation

Another factor that could be taken into account for the above-described operation is the power usage. A sector may use the entire available bandwidth, but each set had its own rules of maximum power usage for the sub-channels included therein.

Figure 6:
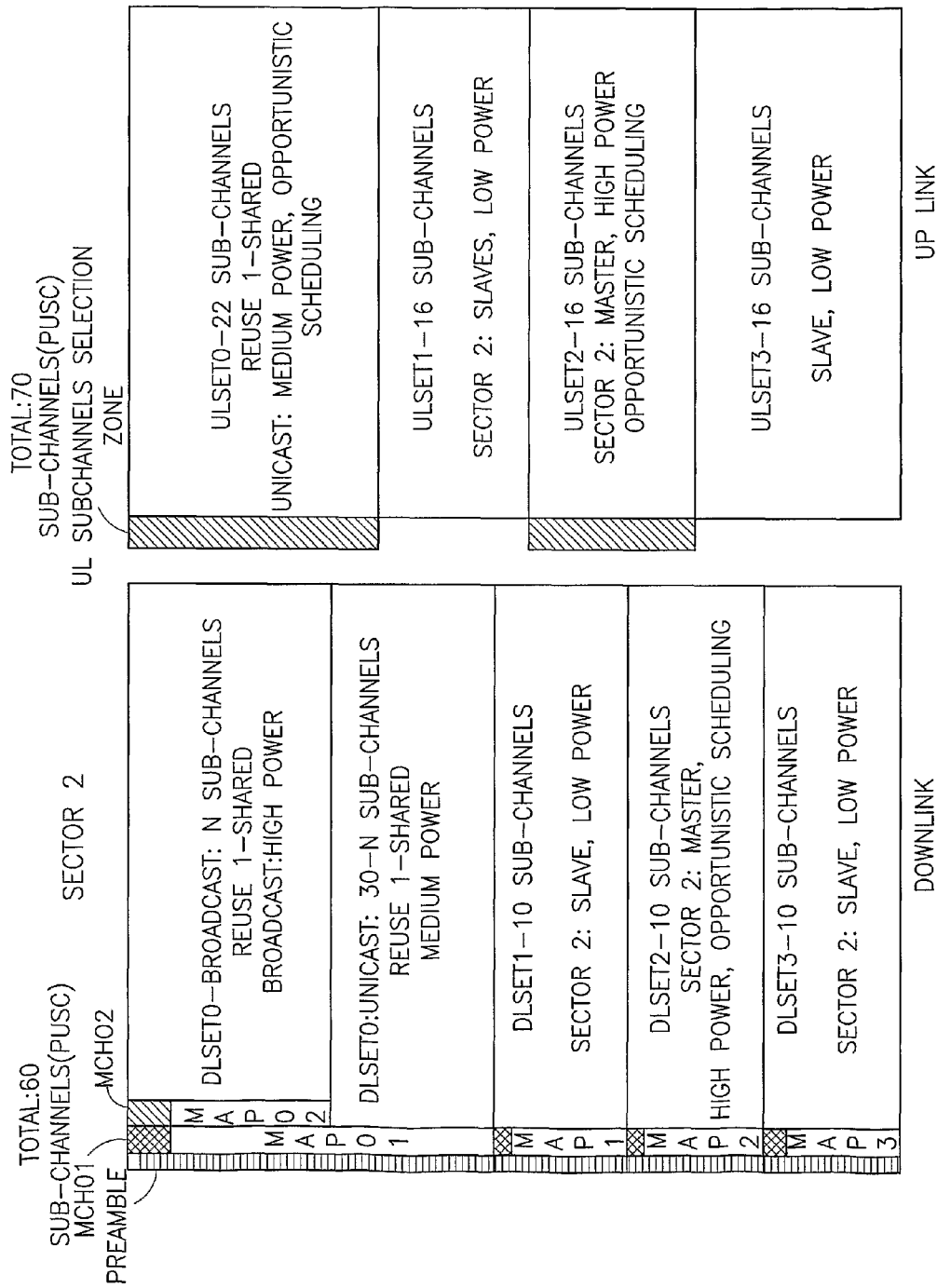
FIG. 6 presents an example of frame structure as used by a specific sector in the base station, as Sector 2 (North)

The example presented in FIG. 6 for the BS Sector 2 operating within a 20 MHz channel and using 2k FFT, relates to 60 DL sub-channels and 70 UL sub-channels. As shown in the figure, Sector 2 could typically use part of the reuse 1 area for broadcasts and another part for unicasts. In order to limit the inter-cell interference between the DLSET1 allocations, the transmitted power in this set is lower than the maximum unicast power allowed in DLSET2, due to the fact that it can transmit the BS unicasts at the maximum sub-channel power. DLSET2 is also referred to as a master set and DLSET1, DLSET3 are referred to as slave sets.

FIG. 7 shows an example of maximum power density levels (per sub-channel) between sets for the same BS sector as described above. The sub-channels assigned to DLSET1 and DLSET3, referred to as slave sets, may also be used, however, the power limitation per sub-channel should be such as not to create interference to the sectors using the DLSET1 or DLSET3 as master allocations. An example of a practical approach may be to limit the transmitted power per sub-channel of the slave systems to a certain level, such as 12 dB lower than the maximum BS transmission power in master state, or may use collaborative MIMO techniques for reducing the interference.

The sub-channels comprised in the slave set transmit their preambles at attenuated power per sub-carrier. They may use their own MCH and MAP, however in order to reduce the receiver complexity, a more practical approach may be that the MAPs relevant to the slave sets are transmitted as part of the reuse 1 unicast (MAP01) and/or part of the master unicast (MAP2 in this example).

According to the example shown in FIG. 7, sector 2 may use 50% of its sub-channels in reuse 1. The remaining 50% is equally divided between the three sets used in reuse 3, every set getting 16.7% of the channel bandwidth. Thus, sector 2 would get 67% of the channel in the reuse 1 and its master set. This is similar to the fractional frequency reuse (⅔), used today for reuse 1 simulations, however the inter-cell interference may drastically be reduced.

FIG. 8 shows the power distributions per sets in sector 3. It can be seen that the sub-channels using the master power level (maximum power per sub-channel) applied for the DLSET3 use a different sub-channel partition (set) from the sub-channels using the master allocation in sector 2.

Uplink Sub-Frame

The same principles may also be applied to the UL sub-channels since they are also divided in reuse 1 usage (ULSET0) and reuse 3 usage (ULSET1, ULSET2 and ULSET3). In reuse 3 mode, the MSs transmitting in the master ULSET can use the maximum power, while those transmitting in the slave sets are required not to create interference to the master sector using the same frequency partition. This requirement can be fulfilled either by limiting the transmitted power or by implementing interference cancellation scheme by using matrix pre-coding (MIMO techniques). The MSs transmitting in a reuse 1 mode have the power limited by the inter-cell interference criteria.

The UL frame includes a special zone, preferably to be used in conjunction with a pro-active opportunistic scheduling and eventually with the UL sounding. This zone, named "UL sub-channel selection zone", is used for the determination of the "best available channel". A sector will use this zone for the sub-channels included in reuse 1 mode and for those included in the master reuse 3 set. The scope of this zone is to assess the best available UL sub-channel for opportunistic scheduling and to increase the UL cell data throughput by using the best available sub-channel i.e. interference mitigation is achieved by setting different power control schemes. By another embodiment of the invention, the method provided enables the use of UL sub-channels sounding in getting the information regarding the channel frequency-dependent attenuation and phase.

Frame Type 2—Alternate OFDMA Frames

Figure 9:
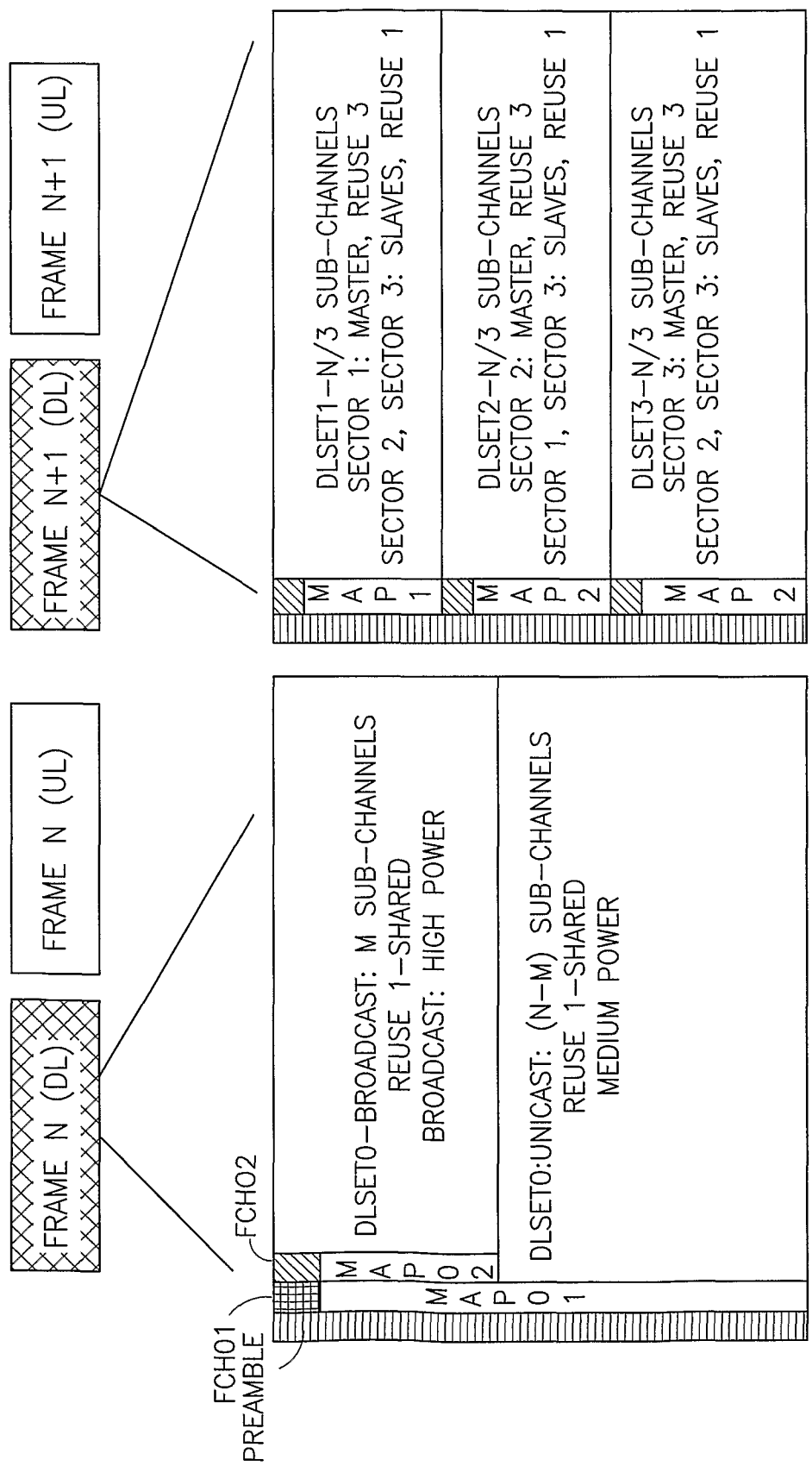
FIG. 9 illustrates a schematic DL super-frame structure suitable for 3 sector deployments with alternate frames.
Figure 10:
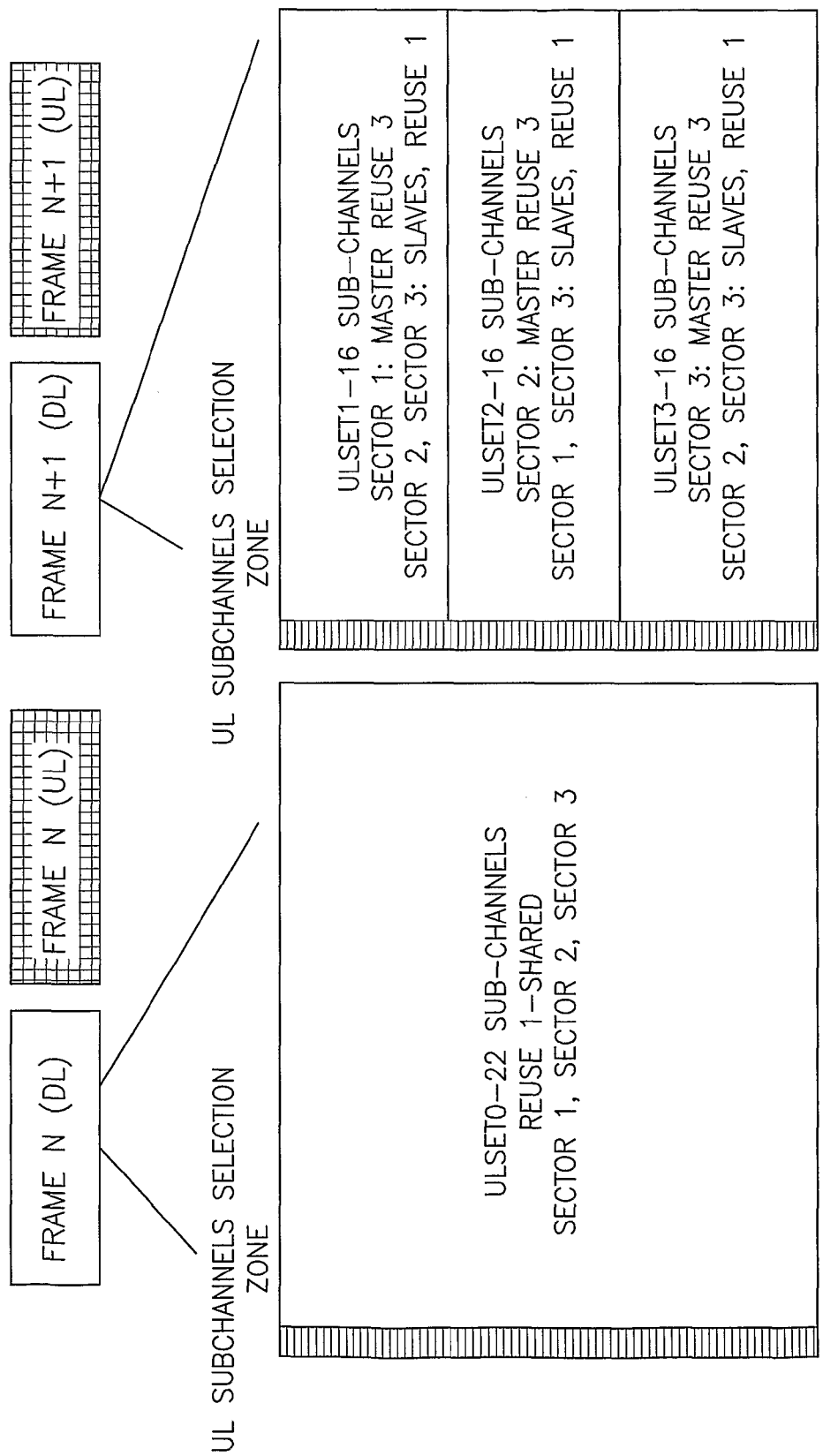
FIG. 10 illustrates a schematic UL super-frame structure suitable for 3 sector deployments with alternate frames.

By another embodiment of the present invention the method provided enables the combination of the reuse 1 activity and reuse 3 activity in alternate frames forming a super-frame. By this approach, the reuse 1 activity may be concentrated for example in the first frame, while the reuse 3 activity may be concentrated in a second frame. FIG. 9 presents such a combined approach for DL where the MSs receive the relevant DL traffic every two frames, and FIG. 10 illustrates, a corresponding UL allocation. However, this embodiment may be associated with higher accumulated delay and reduced granularity, limited by the frame duration. By another embodiment, which may be used for example for large broadcast activity, two frames are allocated for the reuse 1 activity while one frame for the reuse 3 activity.

Frame Type 3—OFDMA Frame Split Approach

Figure 11:
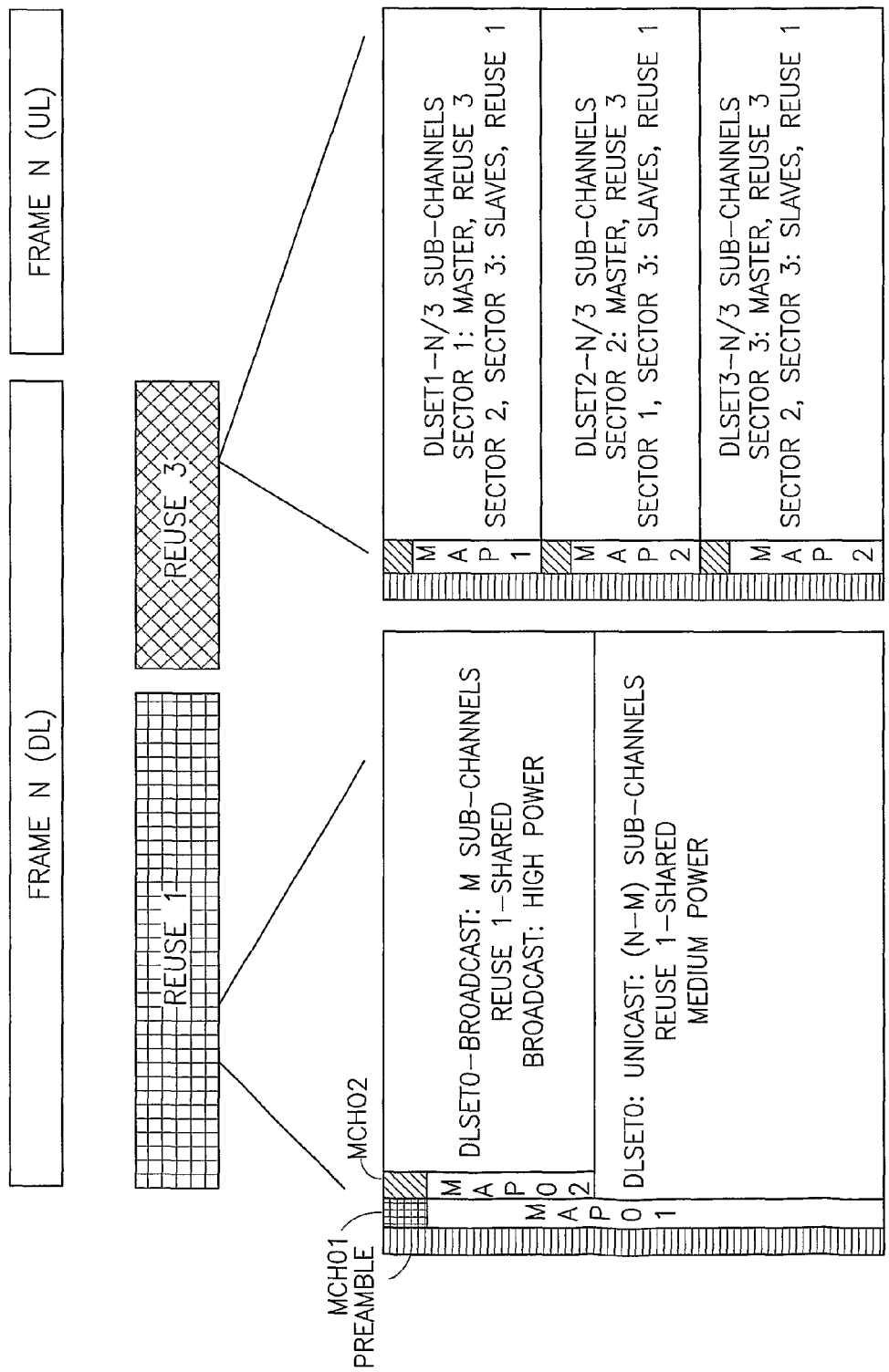
FIG. 11 presents a DL frame structure suitable for 3 sector deployments, with time split of the frame.
Figure 12:
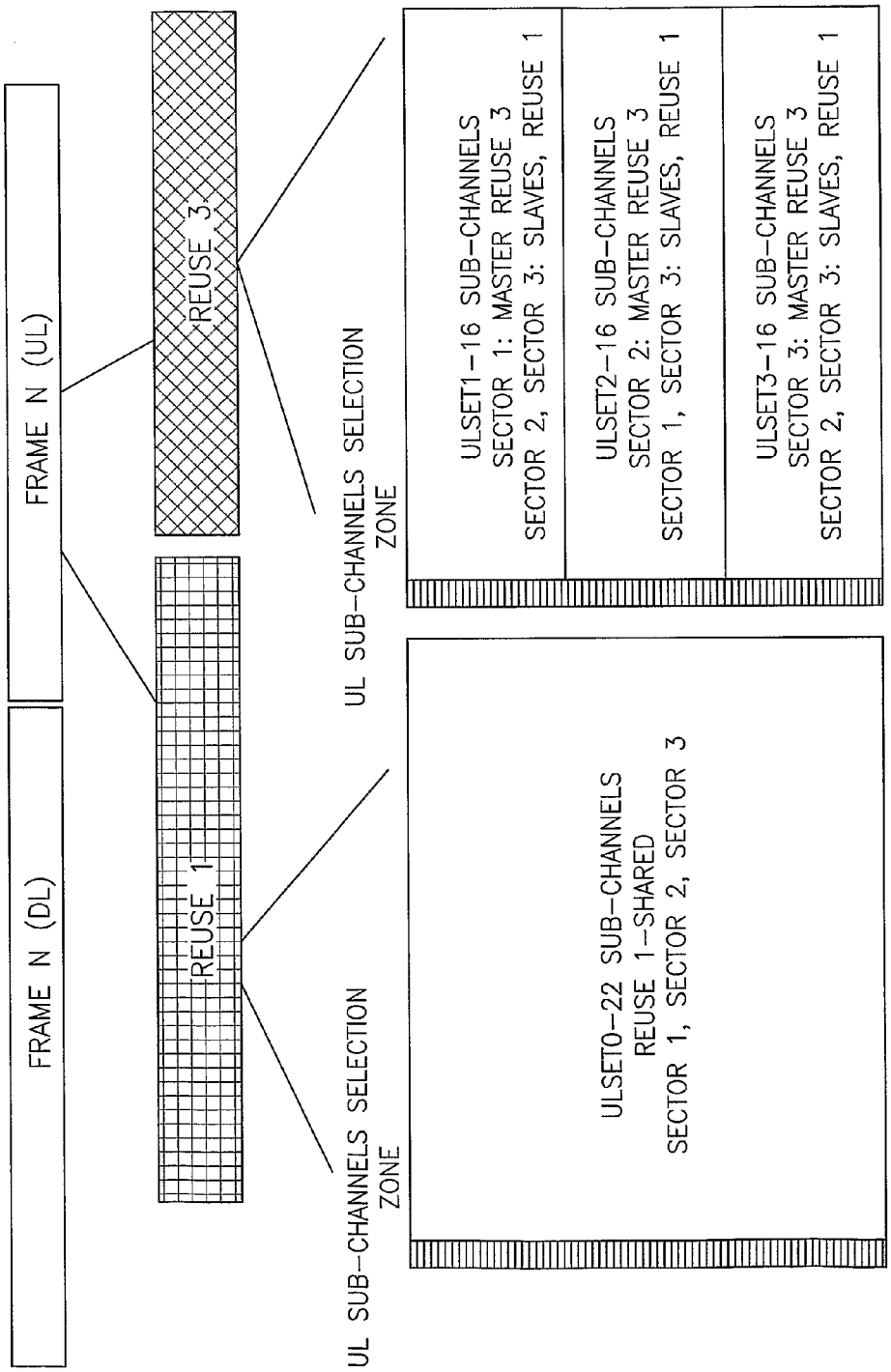
FIG. 12 presents a UL frame structure suitable for 3 sector deployments, with time split of the frame.

In another example of implementing the present invention in cases that enjoy low delays, the frame is divided between reuse 1 and reuse 3. However, when compared with the frame described in FIG. 2, in the DL and UL frame structure described in FIGS. 11 and 12 respectively, the overhead due to MAC headers and MAPS will be higher. As can be seen in these figures, each of the DL and UL sub-frames is divided between the reuse 1 and reuse 3 operations.

Selection of the Appropriate SET

One of the assumptions made in the above description is that the BSs are managed and are informed of the general sub-channel allocation for different DL sets. However, in a given deployment situation, using a non-regular grid, it would be necessary to determine the least interfered of the sets allocated for the reuse 3 operation of each sector.

Due to the fact that no MSs are connected to the BS at the initial phase, each BS sector measures the UL interference created by the sectors and uses the ULSET enjoying the minimum interference experience.

Advantages of the Using SETS Within the Frame Structure

Figure 13:
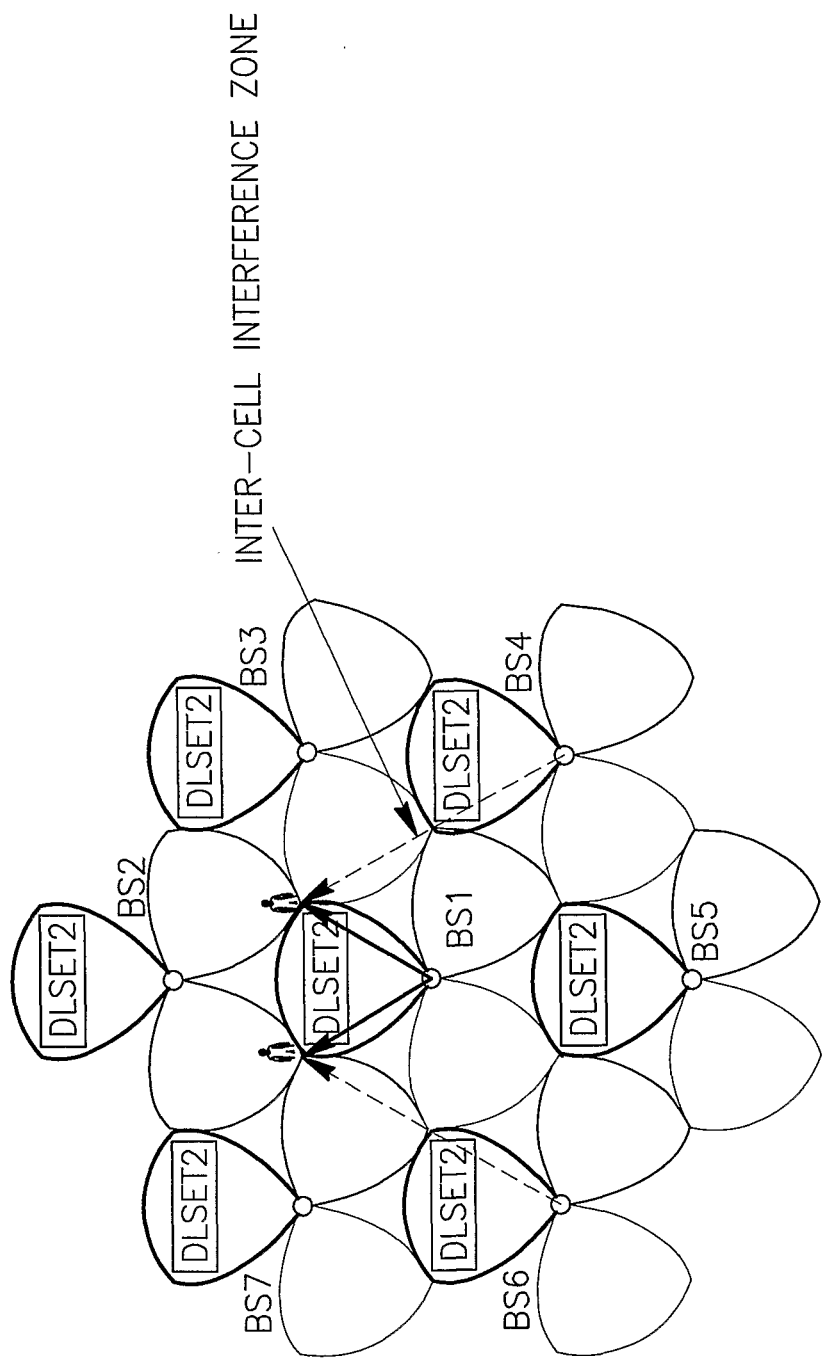
FIG. 13 shows a schematic presentation of the DL inter-cell interference using an embodiment of the present invention.
Figure 14:
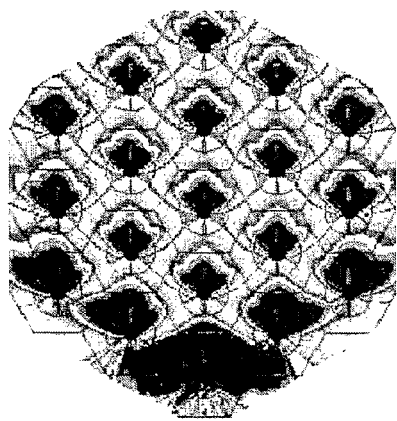
FIG. 14 shows the results of a deployment simulation of reuse 3 for rural deployment environment.
Figure 14:
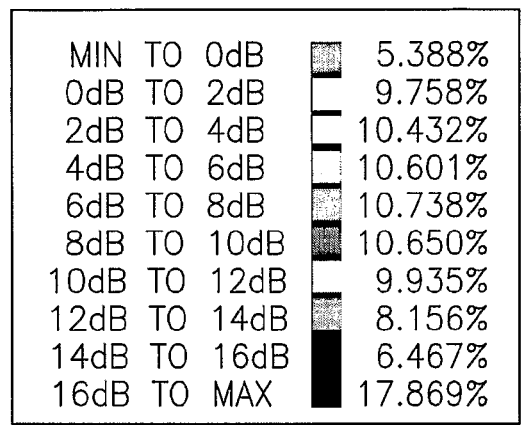

Some of the obtainable advantages of using sets inside the frame structure are presented in FIGS. 13 and 14, where it is shown how the usage of the reuse 3 at cell margin and the reduction of the power for the sub-channels using reuse 1 operation cause a dramatic reduction of the inter-cell interference. It should be noted that the same master set partition was used in FIG. 13 as in FIG. 6 and FIG. 7. The interference picture in the cellular deployment in FIG. 13 demonstrates the improved situation at the cell boundary. Still, one would experience some interference from the other cells. The level of interferers is illustrated in the DL transmission as dashed lines in FIG. 13. The strongest interferers are Sectors 1 from BS 5 and BS 4, which typically may contribute together 8 dB S/I. The aggregated remote interferers can decrease the S/I around 6 dB. However, the S/I ratio has been dramatically improved from about −5 dB to approximately +6 dB. This improvement will be translated into both cell size and throughput. A simpler calculation may show that with the assumption that 50% of the available spectrum will be use in reuse 1 and the rest in reuse 3, for downlink, one would get:

- Every sector uses more than 67% of the available channel in a guaranteed mode;
- Additional 33% can be used if the scheduling and power levels will be such so as not to create interference to the Master allocations;
- Data rate in the areas using the reuse 3 is improved according to the 11 dB difference, which means an improvement of at least 9 times:
    - 7 dB is due to changing from QPSK½ rep. 6 to QPSK½ (6 times)
    - 3 dB is due to changing from QPSK ½ to QPSK ¾ (1.5 times).

FIG. 14 presents the results of a deployment simulation, showing the SIR for reuse 3 in a cellular deployment, rural propagation model, interference limited, outdoor MS, on a DLSET. It is possible to see that the cell margin is covered at SIR of 6.8 dB, which corresponds to the calculation above.

FDD (Frequency Division Duplex) Operation

Figure 15A:
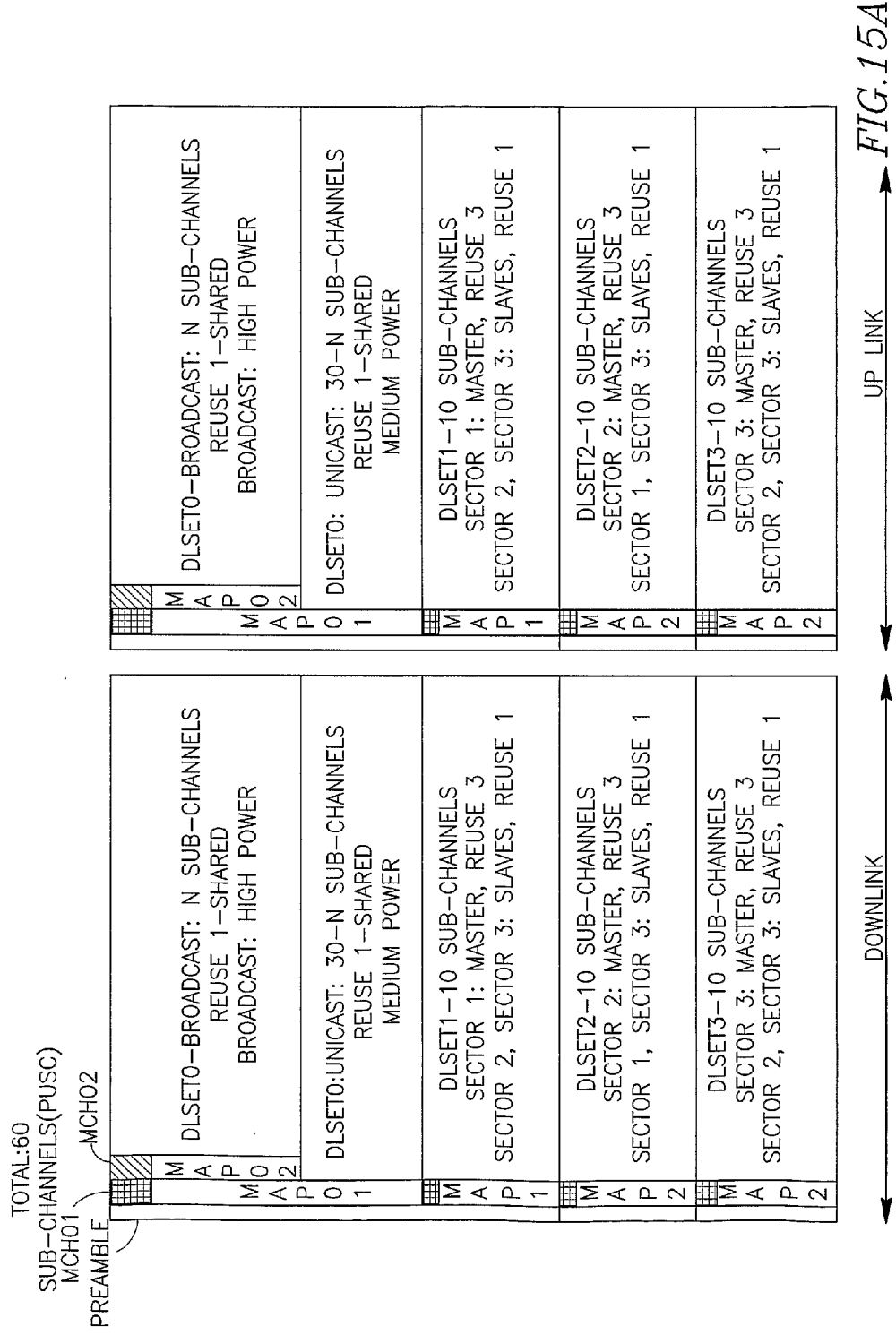
FIGS. 15A and 15B illustrate a schematic frame for FDD operation.
Figure 15B:
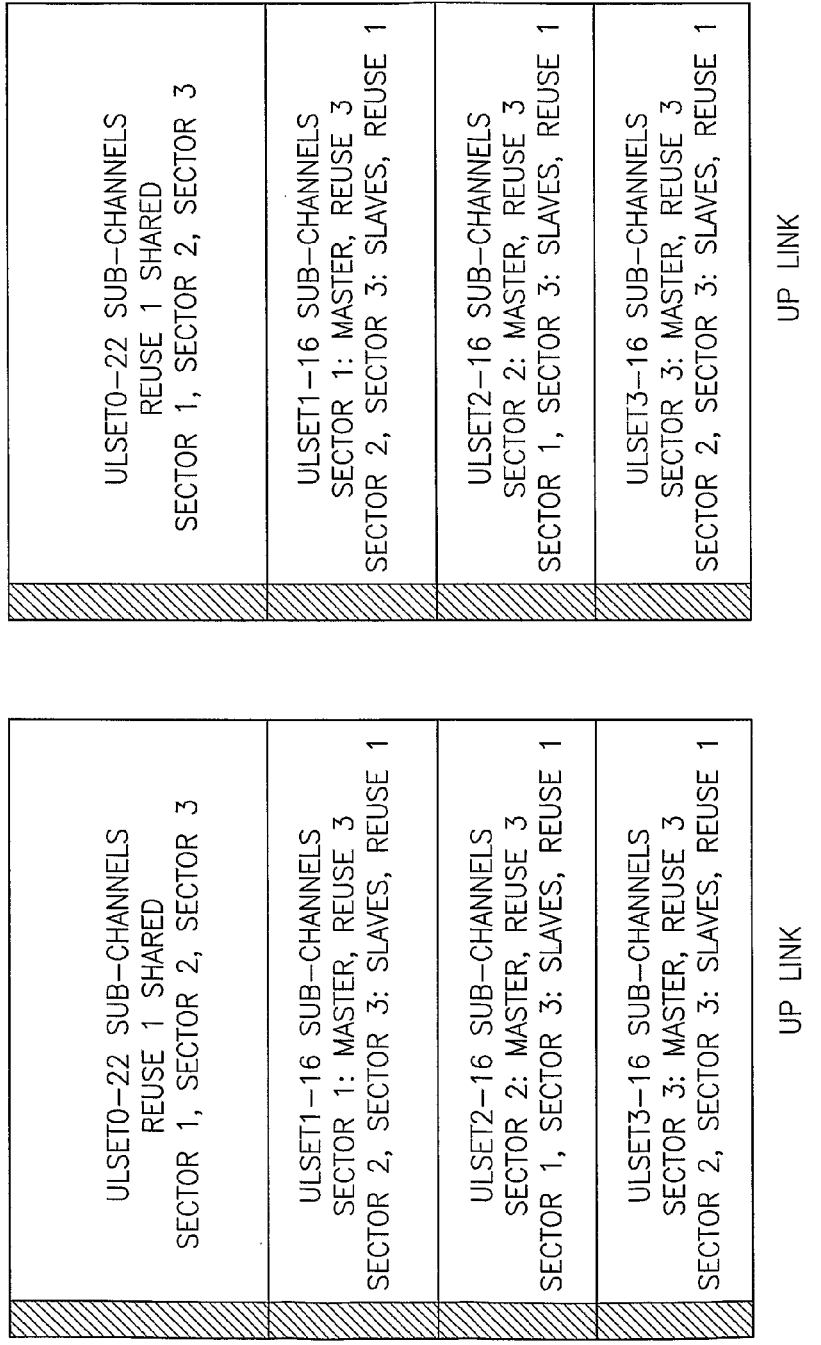

According to another aspect of the present invention the FDD operation can be made suitable for H-FDD (Half-duplex FDD) SS (Subscriber Station) operation. In order to achieve such mode of operation, the SSs' operation shall not be scheduled during the preambles, MCH and MAP transmission, as exemplified in FIGS. 15A (downlink) and 15B (uplink).

ZONEs Inside SETs

The existing 802.16e ZONEs in a frame are basically differentiated according to the used approach for increasing the range and capacity. An SS has to find the ZONE location based on the decoding first the MAP at the start of frame, even though the reception of the MAP itself might be affected by high interference. This limits the range of operation and also may increase the requested time for MAP transmission, due to the low modulations that would be used.

The most efficient allocation of ZONEs within every set is done if the allocation is as long as possible in frequency domain, in order to reduce the overhead generated by eventual preambles, MAPs and MAC headers.

In order to solve these problems, one may place at a pre-defined sub-channel and time locations (preferably the start of frame) the preambles specific to every zone, the MCH (MAP Control Header) and the MAP of the zone. Further, a zone can be organized with different bursts according to the modulation and coding used. The spectral efficiency is increased if we can directly use the high performance zones, instead of starting the operation in the frame by using lower performance zones.

SET Organization in ZONEs

Figure 16:
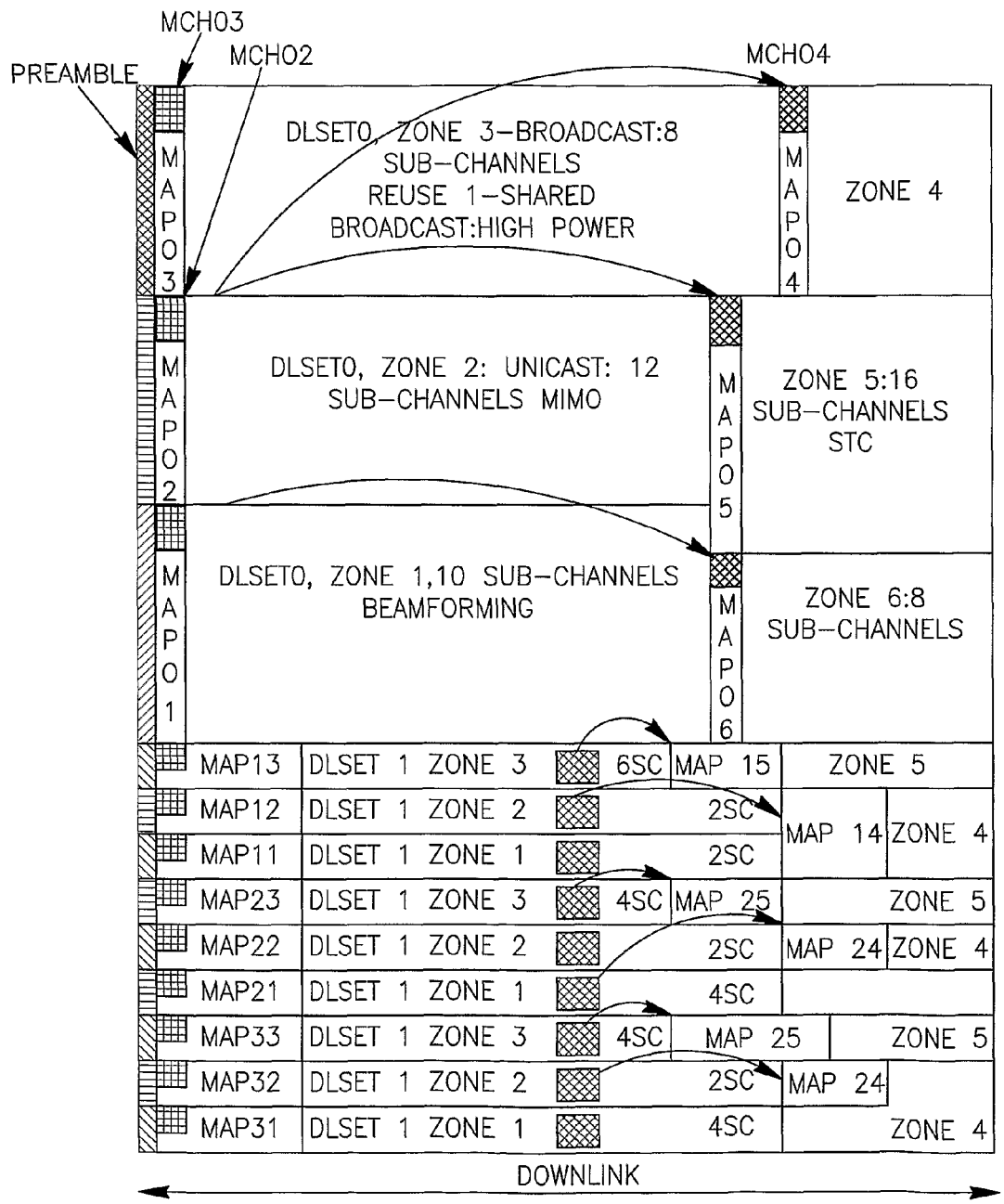
FIG. 16 presents a schematic frame divided to zones for DL MIMO Transmission Scheme.

FIG. 16 shows a division of a set into zones. In this example we begin with three zones at the ZONE start and later on another two zones are used.

In the pre-defined sub-channels, the respective preambles transmitted are specific to the zones used inside the set. If potentially there are more zones than those used at the beginning of the frame, those zones might be scheduled in the next frame or after ending the starting zones. For example, we may start the DLSET with three zones, each using for example one of the MIMO or time-space coding matrixes A, B, or C, defined, for example in the IEEE 802.16 standard. We start with the preambles, followed by MCH. The MAPs are transmitted using the suitable matrix. Only the MCH might use a pre-known robust modulation, however due to its short duration, its impact on the general overhead will be much lower.

The MCH location (sub-channel number) may be known a priori or may be indicated by the preamble coding. MCHi will preferably indicate not only those parameters essential for the decoding the MAP of zone i, but also the coordinates for the start of this zone and another two zones, zone m and zone n. The MCH will therefore preferably include:

- type of the ZONEi (containing the MAP);
- permutation used;
- starting coordinates (sub-channel, number of consecutive sub-channels);
- modulation and coding of the zone's MAP;
- the duration of the zone;
- starting coordinates of ZCHm (the start may be at the same frame or over multiple frames);
- preamble indicator in zone m;
- starting coordinates of ZCHn (the start may be at the same frame or over multiple frames); and
- preamble indicator in zone n.

In FIG. 16, SET 0 starts with one broadcast zone and two unicast zones. The unicast zones may indicate the start of the proceeding zones, by the starting coordinates of the ZCHm. ZONE4 in reuse 1 area takes advantage of the fact that the broadcasted traffic is reduced when transmitting MPEG inter-frames. The MCH at the start of the frame points to another MCH within the frame. This approach as exemplified herein in SET 0 may be referred to as a "linked-MCH approach".

Alternatively, the MCH may have fixed locations within the set. Such an example is illustrated in FIG. 16 for SET 1, SET 2 and SET 3. There are 3 MCH fixed location at the start of DLSET1 and another 3 fixed locations around the middle of DLSET1. This approach may be referred to as a "fixed MCH approach". The need to indicate the next relevant zone over a number of frames may result due to the restrictions of the coexistence with other systems.

A similar approach for the zone definition, as shown above for the downlink, can be used in up-link, mutatis mutandis. However in the UL direction the use of MCH and MAPs is limited only to mesh operation, when a subscriber station or relay may schedule the activity of other subscriber stations or relays.

As will be appreciated by those skilled in the art, the base station as well as the subscriber terminal of the present invention are preferably operative according to a standard wireless protocol. Such a protocol may be OFDMA, cellular protocol, WiMax protocol, LTE protocol, and the like, all without departing from the scope of the present invention.

The invention claimed is:

1. A method for transmitting a combined frequency reuse communication in a wireless network wherein said wireless network comprises at least two base stations, each of which is operative to transmit communications to at least three sectors and wherein communications transmitted by each of said at least two base stations are transmitted along a plurality of sub-channels associated with given frequency channel partitions, the method comprising:

provided at least one of said transmitted combined frequency reuse communication frames comprising at least one sub-channel operative in accordance with a first reuse scheme and at least one other sub-channel operative in accordance with a second reuse scheme which is different from said first reuse scheme;

assigning transmission power for conveying communications along at least one sub-channel in each of said at least three sectors according to said first reuse scheme;

assigning transmission power for conveying communications along at least one sub-channel in each of the other sectors according to said first reuse scheme; and wherein the transmission power for conveying communications along at least one sub-channel assigned in each of said at least three sectors according to said first reuse scheme, is substantially equal to the transmission power used for conveying communications according to said first reuse scheme in each of the other sectors, and providing the at least one other sub-channel operative in accordance with the second reuse scheme, configured to convey communications at a transmission power higher than a first pre-defined threshold in at least one of said at least three sectors and to convey communications in at least one of the other sectors at a transmission power level lower than said first pre-defined threshold but higher than a second pre-defined threshold.

2. A method according to claim 1, further comprising dividing said plurality of sub-channels into a plurality of groups, wherein at least one of said plurality of groups is characterized in that all sub-channels comprised therein are transmitted using substantially the same transmitting power.

3. A method according to claim 1, further comprising dividing said plurality of sub-channels into a plurality of groups, wherein at least one of said plurality of groups is capable of modifying at least one transmission parameter of at least one of the sub-channels comprised therein.

4. A method according to claim 1, further comprising allocating at least one group of said plurality of sub-channels for transmitting communications in at least two sectors.

5. A method according to claim 1, further comprising using at least one group of said plurality of sub-channels for transmitting communications in at least one sector of said at least three sectors at said transmission power level higher the first pre-defined threshold.

6. A method according to claim 5, further comprising using the same group of sub-channels by at least one other sector of said at least three sectors provided that the level of interference to said at least one sector is acceptable.

7. A method according to claim 6, further comprising using lower power or interference cancellation techniques to mitigate interference to said at least one sector.

8. A method according to claim 1, further comprising transmitting said communications by said at least one of said two base stations according to a pattern whereby at least two alternate OFDMA frames constituting a super-frame, and wherein at least one sub-channel comprised in one of the frames constituting said super frame is operative in accordance with a different reuse scheme than any of the sub-channels comprised in an alternate frame.

9. A method according to claim 1, further comprising associating each of at least two different frequency channel partitions with a different group of sub-channels, and wherein transmission of control information associated with each group of sub-channels is characterized by having a different modulation scheme and/or channel coding and/or MIMO matrix coding mode.

10. A method according to claim 1, further comprising:
providing an MS operative to communicate with at least one of the at least two base stations in accordance with at least one of the first and second reuse schemes with a pre-defined allocation of sub-channels, and in response to the MS sending a signal to said at least one base station, selecting a sub-channel from among the allocated sub-channels for the MS to communicate with the at least one base station.

11. A method according to claim 1, further comprising splitting at least one of the groups of sub-channels used in accordance with a reuse 1 scheme into unicast sub-channels and broadcast and/or multicast sub-channels.

12. A method according to claim 11, further comprising transmitting the communications conveyed along sub-channels used for conveying broadcast data while using a higher sub-channel power than power used for communications transmitted along sub-channels used for conveying unicast data.

* * * * *